March 16, 1954     A. C. MacFARLANE     2,672,434
PURIFICATION OF ACRYLONITRILE BY DISTILLATION
Filed Oct. 27, 1952
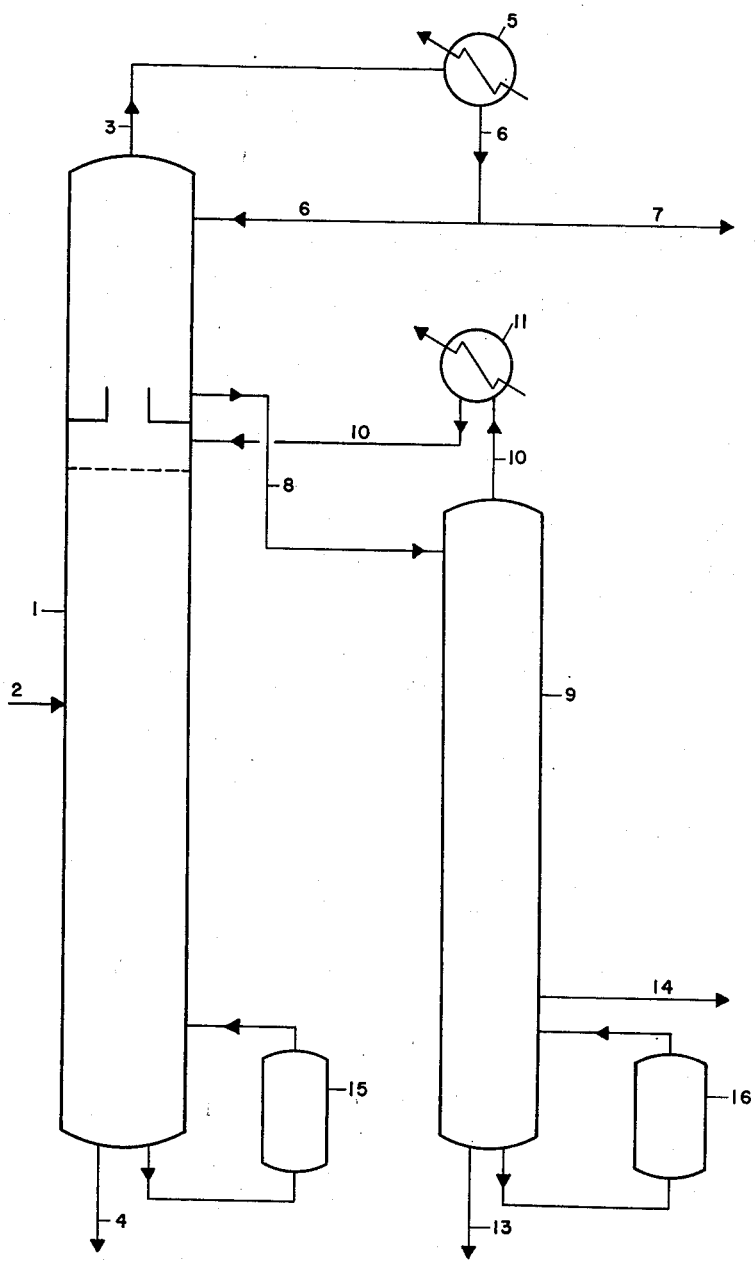
INVENTOR.
A.C. MacFarlane
BY
ATTORNEY Patented Mar. 16, 1954

2,672,434

UNITED STATES PATENT OFFICE 2,672,434

PURIFICATION OF ACRYLONITRILE BY DISTILLATION

Alistair C. MacFarlane, Texas City, Tex., assignor to Monsanto Chemical Company, St. Louis, Mo., a corporation of Delaware Application October 27, 1952, Serial No. 317,014

8 Claims. (Cl. 202—40)

This invention relates to the purification of acrylonitrile. More particularly, the invention relates to an improved method of removing acetaldehyde and hydrogen cyanide from crude acrylonitrile.

Acrylonitrile has become an important chemical of commerce having found particular application in the field of plastics and resins and in the development of synthetic fibers. For many of these specialty uses, particularly where the chemical is employed in polymerization processes, it is of great importance that the acrylonitrile be of the highest degree of chemical purity. In the preferred method for the production of this nitrile, i. e., by the reaction of acetylene with hydrogen cyanide in the presence of copper salts, the crude product is always contaminated with many types of impurities. Purification of the crude product poses many problems, one of the more serious of which involves the removal of acetaldehyde and hydrogen cyanide, especially when both these compounds are present.

By the conventional purification methods, acrylonitrile containing on the order of about 2000 p. p. m. (parts by weight per million parts of acrylonitrile) each of acetaldehyde and hydrogen cyanide can be produced without too much difficulty. Such methods, however, are ineffective for producing acrylonitrile of the requisite high purity required for many commercial processes, e. g., to meet usual specifications calling for 5 p. p. m. or less of hydrogen cyanide and 100 p. p. m. or less of acetaldehyde. Ordinary distillation techniques fail, for example, because of the very nature of the impurities. Acetaldehyde and hydrogen cyanide are present in acrylonitrile both as the free aldehyde and hydrogen cyanide and also combined as lactonitrile. In liquid solution, the equilibrium $$CH_3CHOHCN \rightleftharpoons HCN + CH_3CHO$$

exists. However, at the temperatures required for fractionation, the lactonitrile in the bottom of the column partially dissociates into acetaldehyde and hydrogen cyanide and contaminating quantities of both these compounds are invariably removed overhead with the acrylonitrile product.

Some chemical methods of purification have been devised such as, e. g., the method proposed in U. S. Patent 2,351,157, but, on the whole, these are elaborate and expensive both from an operational standpoint and from the standpoint of equipment required.

It is an object of this invention, therefore, to provide an improved process for the purification of acrylonitrile.

It is a particular object of this invention to provide a process for the purification of acrylonitrile whereby acrylonitrile substantially free from hydrogen cyanide and acetaldehyde is obtained.

It is a further object of the invention to provide an improved physical system of purification of acrylonitrile which is simple and economical whereby acrylonitrile substantially free from acetaldehyde and hydrogen cyanide is obtained.

Other objects and advantages will be apparent from the following description of the invention.

It has now been discovered that substantially pure acrylonitrile can be obtained from crude acrylonitrile containing acetaldehyde, hydrogen cyanide, lactonitrile and other high boilers by a distillation process which comprises feeding the crude acrylonitrile into the intermediate section of a fractionating column, withdrawing the high-boiling impurities including undissociated lactonitrile from the bottom of the column, removing a liquid sidestream of acrylonitrile at a point in the upper section of the fractionating column, introducing this liquid stream immediately into a stripping column where the free acetaldehyde and hydrogen cyanide in the liquid are stripped overhead, and recovering substantially pure acrylonitrile in either the vapor or liquid state from the bottom of the stripping column.

The process of the invention is based upon the fact that, in the equilibrium reaction mentioned above, the rate of recombination of acetaldehyde and hydrogen cyanide is reasonably slow. The high degree of separation achieved is, therefore, contingent upon minimization of hold-up time throughout the system. Actually, two stages of operation are involved and significant reductions in acetaldehyde and hydrogen cyanide content are achieved in each stage. In the first stage, since both acetaldehyde and hydrogen cyanide are approximately six to eight times more volatile than acrylonitrile, the vapor above a plate in the upper section of the column contains about six to eight times more of the acetaldehyde and hydrogen cyanide impurities than does the liquid on the plate. Removal of acrylonitrile as a liquid sidestream from the plate, therefore, provides an acrylonitrile product that is some six to eight times purer with respect to these impurities than the product acrylonitrile derived by removal of the overhead vapor stream as provided for in the usual distillation techniques of the prior art. Thus a crude containing 1000 p. p. m. of hydrogen cyanide can be reduced in this part of the system to about 200 p. p. m.

In the second stage, the acrylonitrile stream of low cyanide and acetaldehyde content can be effectively stripped of substantially all of these remaining impurities since the stripper operation is designed to continually remove the dissociation products while no liquid acrylonitrile is allowed to remain in contact with free acetaldehyde and hydrogen cyanide long enough for their reassociation to occur.

The process of the invention will be more clearly understood from the following description of a specific embodiment with reference to the attached diagrammatic flow-sheet illustrating the same.

Referring to the drawing, numeral 1 represents a fractionating column into which a crude acrylonitrile stream containing acrylonitrile, acetaldehyde, hydrogen cyanide, lactonitrile and other impurities higher boiling than acrylonitrile, is introduced via line 2. Heat is applied to the column by conventional means, such as the reboiler 15. Sufficiently high temperature is maintained to take the acetaldehyde and hydrogen cyanide present in the feed or formed by the decomposition of lactonitrile overhead via line 3. Lactonitrile and other impurities boiling higher than acrylonitrile are withdrawn via line 4. The overhead vapors are condensed by means of a condenser 5, designed to give a minimum hold-up, and returned to the column via line 6 to supply the necessary reflux. To prevent an accumulation of the low-boiling acetaldehyde and hydrogen cyanide in the top of the column, a small bleed of the liquid is taken off the condenser 5 via line 7 to maintain the desired conditions. This stream may be reprocessed for recovery of acrylonitrile.

A stream of liquid acrylonitrile is removed from a liquid collecting tray in the upper section of column 1 and sent via line 8 to a stripping column 9 of sufficient height to immediately strip from the acrylonitrile any remaining free acetaldehyde and hydrogen cyanide. Heat is supplied to the stripper by means of reboiler 16. The acetaldehyde and hydrogen cyanide vapor stream is taken overhead from column 9 via line 10, condensed in condenser 11, and returned directly to column 1, entering near the plate where the liquid acrylonitrile stream is withdrawn, to serve as reflux for the lower section of this column. Alternatively, only a sidestream of acrylonitrile may be allowed to run off as product from the liquid collecting tray while the remainder of the liquid overflows down the column to provide the necessary reflux. Under these conditions, condenser 11 may be omitted and the acetaldehyde and hydrogen cyanide vapors coming overhead from the stripping column may be returned directly to the fractionating column. Substantially pure acrylonitrile is withdrawn from the bottom of the column. This may be as a liquid stream via, for example, line 13, or optionally, as a vapor stream withdrawn via line 14.

The following example is illustrative of the effectiveness of the process of the invention:
A crude acrylonitrile of the following composition

| | Percent by weight |
|---|---|
| Acrylonitrile | 94.0 |
| Acetaldehyde | 0.5 |
| Hydrocyanic acid | 0.01 |
| Lactonitrile | 2.5 |
| High boilers | 3.0 | was distilled in a system like that represented in the attached drawing and following the same general procedure outlined above. The feed was introduced into a fractionating column of approximately 14 plates which was operated at a pressure of 140 mm. of Hg absolute. Bottoms temperature was maintained at about 50° C. while the overhead temperature was controlled at about 30° C. The liquid acrylonitrile stream was withdrawn from the 6th plate from the top of the column and stripped in an auxiliary column of approximately five theoretical plates. Stripper temperature was about 30–32° C. Acrylonitrile recovered from the stripping column was of extremely high purity containing only 4 p. p. m. (0.0004%) of hydrogen cyanide and essentially no acetaldehyde.

The fractionation column employed is a conventional one, so designed that it consists of two sections. The function of the column below the liquid sidestream take-off is to separate acrylonitrile from higher boiling impurities. The upper section of the column, i. e., the section above the liquid sidestream, serves to increase the concentration of hydrogen cyanide and acetaldehyde in the overhead vapor. While the number of theoretical plates in the bottom section is fixed by its function, the number in the upper section may be varied to secure optimum efficiency, particularly with regard to control of the amount of acrylonitrile in the bleed stream, which can be economically reprocessed in the overall purification system.

While the example given specifies distillation at reduced pressure and this represents preferred operation, the process of the invention is not restricted thereto and it may be carried out at atmospheric or superatmospheric pressure if desired.

The distillation process is preferably carried out in a continuous manner but batchwise operation is equally effective.

What is claimed is:

1. A method of refining crude acrylonitrile containing acetaldehyde, hydrogen cyanide, lactonitrile and other impurities boiling higher than acrylonitrile which comprises feeding the said acrylonitrile into an intermediate section of a fractionating column, withdrawing the high-boiling impurities including the undissociated lactonitrile from the bottom of said fractionating column, removing a liquid sidestream of acrylonitrile at a point in the upper section of the fractionating column, introducing said liquid stream immediately into a stripping column where the free acetaldehyde and hydrogen cyanide are stripped overhead from the liquid, and recovering substantially pure acrylonitrile from the bottom of said stripping column.

2. A method of refining crude acrylonitrile containing acetaldehyde, hydrogen cyanide, lactonitrile and other impurities boiling higher than acrylonitrile which comprises continuously feeding the said acrylonitrile into an intermediate section of a fractionating column, continuously withdrawing the high-boiling impurities including the undissociated lactonitrile from the bottom of said fractionating column, continuously removing a liquid sidestream of acrylonitrile at a point in the upper section of the fractionating column, continuously introducing said liquid stream immediately into a stripping column where the free acetaldehyde and hydrocyanic acid are stripped overhead from the liquid, and continuously recovering substantially pure acrylonitrile from the bottom of said stripping column.

3. A method of refining crude acrylonitrile containing acetaldehyde, hydrogen cyanide, lactonitrile and other impurities boiling higher than acrylonitrile which comprises continuously feeding said acrylonitrile into an intermediate section of a fractionating column maintained at subatmospheric pressure, continuously withdrawing the high-boiling impurities including undissociated lactonitrile from the bottom of said fractionating column, continuously removing a liquid sidestream of acrylonitrile at a point in the upper section of the fractionating column, continuously introducing said liquid stream immediately into a stripping column maintained at subatmospheric pressure where the free acetaldehyde and hydrocyanic acid are stripped overhead from the liquid, and continuously recovering substantially pure acrylonitrile from the bottom of said stripping column.

4. A method of refining crude acrylonitrile containing acetaldehyde, hydrogen cyanide, lactonitrile and other impurities boiling higher than acrylonitrile which comprises feeding the said acrylonitrile into an intermediate section of a fractionating column, withdrawing the high-boiling impurities including the undissociated lactonitrile from the bottom of said fractionating column, removing a liquid sidestream of acrylonitrile at a point in the upper section of the fractionating column, introducing said liquid stream immediately into a stripping column where the free acetaldehyde and hydrocyanic acid are stripped overhead from the liquid, and recovering substantially pure acrylonitrile as a liquid from the bottom of said stripping column.

5. A method of refining crude acrylonitrile containing acetaldehyde, hydrogen cyanide, lactonitrile and other impurities boiling higher than acrylonitrile which comprises feeding the said acrylontrile into an intermediate section of a fractionating column, withdrawing the high-boiling impurities including undissocated lactontrile from the bottom of said fractionating column, removing a liquid sidestream of acrylonitrile at a point in the upper section of the fractionating column, introducing said liquid stream immediately into a stripping column where the free acetaldehyde and hydrocyanic acid are stripped overhead from the liquid, and recovering substantially pure acrylonitrile as a vapor from the bottom of said stripping column.

6. A method of refining crude acrylonitrile containing acetaldehyde, hydrogen cyanide, lactonitrile and other impurities boiling higher than acrylonitrile which comprises feeding the said acrylonitrile into an intermediate section of a fractionating column, withdrawing the high-boiling impurities including undissociated lactonitrile from the bottom of said fractionating column, condensing the overhead vapors of acrylonitrile, acetaldehyde, and hydrogen cyanide and returning them as liquid reflux to the top of the fractionating column, removing a liquid sidestream of acrylonitrile at a point in the upper section of the fractionating column, introducing said liquid stream immediately into a stripping column where the free acetaldehyde and hydrocyanic acid are stripped overhead from the liquid, and recovering substantially pure acrylonitrile from the bottom of said stripping column.

7. A method of refining crude acrylonitrile containing acetaldehyde, hydrogen cyanide, lactonitrile and other impurities boiling higher than acrylonitrile which comprises feeding the said acrylonitrile into an intermediate section of a fractionating column, withdrawing the high-boiling impurities including the undissociated lactonitrile from the bottom of said fractionating column, condensing the overhead vapors of acrylonitrile, acetaldehyde, and hydrogen cyanide and returning them as liquid reflux to the top of the column, removing a liquid sidestream of acrylonitrile at a point in the upper section of the fractionating column, introducing said acrylonitrile immediately into a stripping column where the free acetaldehyde and hydrogen cyanide are stripped overhead from the liquid, feeding said acetaldehyde and hydrogen cyanide vapors back into the fractionating column, and recovering substantially pure acrylonitrile as a vapor from the bottom of said stripping column.

8. A method of refining crude acrylonitrile containing acetaldehyde, hydrogen cyanide, lactonitrile and other impurities boiling higher than acrylonitrile which comprises feeding the said acrylonitrile into an intermediate section of a fractionating column, withdrawing the high-boiling impurities including the undissociated lactonitrile from the bottom of said fractionating column, condensing the overhead vapors of acetaldehyde and hydrogen cyanide and returning them as liquid reflux to the top of the column, removing a liquid sidestream of acrylonitrile at a point in the upper section of the fractionating column, introducing said liquid stream immediately into a stripping column where the free acetaldehyde and hydrogen cyanide are stripped overhead from the liquid, condensing said acetaldehyde and hydrogen cyanide and feeding them back into the fractionating column, and recovering substantially pure acrylonitrile as a liquid from the bottom of said stripping column.

ALISTAIR C. MacFARLANE.

References Cited in the file of this patent

UNITED STATES PATENTS

| Number | Name | Date |
|---|---|---|
| 2,324,854 | Kurtz et al. | July 20, 1943 |
| 2,405,393 | Atkins | Aug. 6, 1946 |
| 2,415,662 | Teter et al. | Feb. 11, 1947 |
| 2,417,635 | Davis | Mar. 18, 1947 |
| 2,526,676 | Lovett | Oct. 24, 1950 |
| 2,555,798 | Kropa | June 5, 1951 |